United States Patent
Lynn et al.

(10) Patent No.: US 8,560,428 B2
(45) Date of Patent: *Oct. 15, 2013

(54) SYSTEM AND METHOD FOR ONLINE TRADING USING AN ELECTRONIC SPREADSHEET

(75) Inventors: Brian Lynn, New York, NY (US); Lawrence Miller, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 789 days.

This patent is subject to a terminal disclaimer.

(21) Appl. No.: 12/605,411

(22) Filed: Oct. 26, 2009

(65) Prior Publication Data

US 2010/0049668 A1    Feb. 25, 2010

Related U.S. Application Data

(63) Continuation of application No. 10/256,598, filed on Sep. 27, 2002, now Pat. No. 7,620,584.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| 5,339,392 | A |   | 8/1994 | Risberg et al. |
| 5,675,746 | A |   | 10/1997 | Marshall |
| 5,861,883 | A |   | 1/1999 | Cuomo et al. |
| 5,893,079 | A |   | 4/1999 | Cwenar |
| 6,035,287 | A |   | 3/2000 | Stallaert et al. |
| 6,064,985 | A |   | 5/2000 | Anderson |
| 6,134,535 | A | * | 10/2000 | Belzberg ................... 705/36 R |
| 6,195,647 | B1 |   | 2/2001 | Martyn et al. |
| 6,347,307 | B1 |   | 2/2002 | Sandhu et al. |
| 6,996,535 | B1 | * | 2/2006 | Ono et al. .................. 705/26.81 |
| 7,020,632 | B1 | * | 3/2006 | Kohls et al. ..................... 705/37 |
| 2002/0046146 | A1 |   | 4/2002 | Otero et al. |
| 2002/0091615 | A1 |   | 7/2002 | Salvani |
| 2003/0101128 | A1 |   | 5/2003 | Abernethy |
| 2003/0110113 | A1 | * | 6/2003 | Martin ............................ 705/36 |

* cited by examiner

*Primary Examiner* — Jessica Lemieux

(74) *Attorney, Agent, or Firm* — Goodwin Procter LLP

(57) ABSTRACT

A system and method for receiving streamed, real time quotes with respect to financial instruments. The system applies a spreadsheet based investment strategy to the real time quotes, generating electronic orders based on the results of the investment strategy analysis and transmitting the orders for real time execution. The system generates a unique order identifier that allows users to actively track the status of orders in real time. This unique order identifiers can be shared with other users so that other trading strategies can be developed to execute upon the successful execution of the order (e.g., hedging).

10 Claims, 6 Drawing Sheets

Portfolio Management Sample

| | Instrument ID | Description | Bid Qty | Ask Qty | Bid | Ask | Market Pr | Settle Dt |
|---|---|---|---|---|---|---|---|---|
| | | | 165 | 170 | 175 | 180 | 185 | 190 |
| 10 | ISIN_DE0001141281 | OBL 128 3.75 Aug03 | 25,000,000 | 25,000,000 | 100.316 | 100.356 | OPEN | 29-Jul-02 |
| 11 | ISIN_IT0001305454 | BTP 3.25 Feb04 | 25,000,000 | 25,000,000 | 99.515 | 99.555 | OPEN | 29-Jul-02 |
| 12 | ISIN_IT0001376141 | BTP 3.75 Sep02 | 25,000,000 | 25,000,000 | 100.007 | 100.037 | OPEN | 29-Jul-02 |
| 13 | ISIN_IT0001423844 | BTP 4.5 Jan03 | 25,000,000 | 25,000,000 | 100.496 | 100.526 | OPEN | 29-Jul-02 |
| 14 | ISIN_IT0001305454 | BTP 3.25 Feb04 | 25,000,000 | 25,000,000 | 99.515 | 99.555 | OPEN | 29-Jul-02 |
| 15 | ISIN_IT0001305454 | BTP 3.25 Feb04 | 25,000,000 | 25,000,000 | 99.515 | 99.555 | OPEN | 29-Jul-02 |
| 16 | ISIN_DE0001141281 | OBL 128 3.75 Aug03 | 25,000,000 | 25,000,000 | 100.316 | 100.356 | OPEN | 29-Jul-02 |
| 17 | ISIN_DE0001135143 | BUND 6.25 Jan30 | 5,000,000 | 5,000,000 | 116.280 | 116.440 | OPEN | 29-Jul-02 |
| 18 | ISIN_DE0001135143 | BUND 6.25 Jan30 | 5,000,000 | 5,000,000 | 116.280 | 116.440 | OPEN | 29-Jul-02 |
| 19 | ISIN_DE0001135143 | BUND 6.25 Jan30 | 5,000,000 | 5,000,000 | 116.280 | 116.440 | OPEN | 29-Jul-02 |
| 20 | ISIN_DE0001135143 | BUND 6.25 Jan30 | 5,000,000 | 5,000,000 | 116.280 | 116.440 | OPEN | 29-Jul-02 |
| 21 | ISIN_IT0000366325 | BTP 11.5 Mar03 | 15,000,000 | 15,000,000 | 104.414 | 104.454 | OPEN | 29-Jul-02 |

FIGURE 3

SYSTEM AND METHOD FOR ONLINE TRADING USING AN ELECTRONIC SPREADSHEET

This application is a continuation of U.S. patent application Ser. No. 10/256,598 filed on Sep. 27, 2002.

FIELD OF THE INVENTION

The present invention generally relates to systems and methods for online trading, and more particularly to systems and methods for conducting online trading in Over-The-Counter (OTC) instruments using electronic spreadsheets.

BACKGROUND OF THE INVENTION

Online trading of financial instruments such as equities (i.e., stocks) has become increasingly popular. In order to facilitate such trading, systems have been developed to provide data streams of real time exchange market data such as BLOOMBERG™ and REUTERS™. Systems have further been developed to accept this exchange data into electronic spreadsheets and to provide a link from the spreadsheet to exchange trading systems. One such system is known as AUTOMATE™ provided by GL™.

One other such trading system is disclosed in U.S. Pat. No. 6,134,535 to Belzberg. Belzberg discloses an automated trading system to launch a trading order to the order entry system of a stock exchange for stocks listed on the stock exchange. The system monitors real-time data feeds for a list of stocks and their prices that are recorded and displayed to a user in a spreadsheet format on a personal computer. When the composite price of the list of stocks conforms to certain predetermined parameters, the list is transformed into an order, which is immediately sent to an exchange order entry system.

One further trading system is shown in U.S. Pat. No. 5,893,079 to Cwenar. Cwenar discloses a system where an external data interface receives and processes real-time investment information from outside sources. The real-time data is processed and stored on a central server. Multiple users have access to the data through a spreadsheet interface. The system can be used to effect trades and monitor proposed trades for compliance with laws, rules, and preferences. A group of securities can be combined into "baskets". Baskets can also be a single fund or group of funds combined for purposes of transactions.

SUMMARY OF THE INVENTION

The present invention is a system and method for receiving streamed, real time investment quotes, applying a spreadsheet based investment strategy to the real time quotes, generating electronic orders based on the results of the investment strategy analysis and transmitting the orders for real time execution.

In one embodiment of the present invention, the live real time quotes are for Over The Counter (OTC) investments, and in an alternative embodiment, the real time quotes are Exchange Traded (ET) instruments. These real time quotes are preferably provided in a secure session though the publicly accessible Internet. The real time quotes are received by remotely located user workstations (e.g., personal computers) through a standard web browser and a customized Dynamic Data Exchange (DDE) interface into an Excel® spreadsheet. Although the present invention has been developed using Excel®, other comparable spreadsheet applications can be used, such as Lotus 123®. The spreadsheet program contains predefined logic representing an investment strategy that is applied to the received real time quotes. Of particular note is that the present invention is able to employ an investment strategy that encompasses several instruments (e.g., bonds, futures or options).

After the investment strategy logic has processed the real time quotes (in real time) and if the logic indicates that one or more instruments should be bought or sold, an order is automatically generated. This single order can contain instructions to buy or sell a plurality of instruments. In a preferred embodiment, the automatically generated order is confirmed by the operator of the workstation, or if desired, the order can be submitted automatically if it satisfies rules previously established by the user. The order is then electronically transmitted, in a secure session over the public Internet to a dealer that executes the order in real time.

An order identifier is automatically assigned when an order is submitted by a spreadsheet. This order identifier is recorded both in the spreadsheet and in the dealer's trade execution system. The dealer's execution system then provides real-time updates using this order identifier. Thenceforth, the execution status of the order is available in real time to the sender of the order as well as to other parties as authorized by the sender. This feature of the present invention is particularly attractive for developing and executing hedging strategies. For example, a second workstation can be monitoring for executed orders and can generate hedging orders based upon the execution of an original order.

The present invention can instantly evaluate trading strategies, positions, or Profit and Loss (P/L) based on live, executable prices. It automatically executes trades based on the previously spreadsheet calculated portfolio allocations, hedging strategies, funding requirements, etc. The positions contained in the spreadsheet are immediately updated as orders are executed. Multiple orders, either OTC (such as bond or OTC equity warrant orders) or ET (such as future or ET option orders), can be confirmed at once when submitted from the spreadsheet. The present invention further supports Futures and Options order modification and cancellation.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 3 shows a user interface screen illustrating a spreadsheet sheet populated by the present invention;

DETAILED DESCRIPTION OF THE INVENTION

Figure 1:
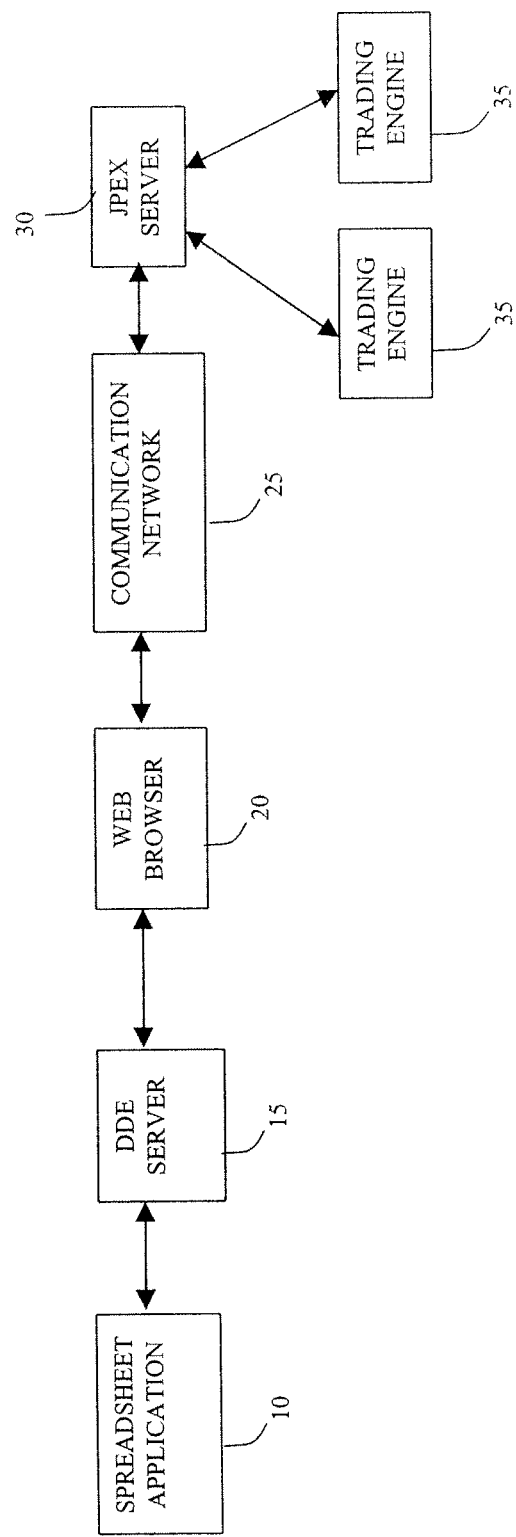
FIG. 1 illustrates the system of the present invention.

The system of the present invention is illustrated in FIG. 1. As previously described, the system of the present invention is a real-time link between a spreadsheet 10 and a server 30 that both feeds the spreadsheet 10 with a real time data feed as well as accepts trade execution orders from the spreadsheet. In a preferred embodiment, the spreadsheet application is the EXCEL™ product from MICROSOFT™, but as appreciated by those skilled in the art, any robust electronic spreadsheet application can be used in the system of the present invention. In the preferred embodiment, the spreadsheet 10 is executing on a personal computer (not shown) preferably running Windows NT™ or another suitable operating system. The standard spreadsheet application 10 is supplemented with "add-in" programming to provide the user interfaces, simplify certain operations in the spreadsheet 10 and to support the functionality described herein (e.g., order submission).

The spreadsheet application 10 is coupled to a Dynamic Data Exchange (DDE) server 15. DDE 15 is an interprocess communication (IPC) system built into most personal computer operating systems. In DDE terminology; the "server" 15 is a piece of software running on a personal computer that serves the DDE requests generated by the DDE client (the spreadsheet 10, e.g., Excel). Alternatively, DDE server 15 is known as a DDE adapter 15. DDE 15 enables two running applications to share the same data. In the present invention, DDE 15 provides links that make it possible for server 30 to supply real-time prices to spreadsheet 10, and to allow spreadsheet 10 to submit orders to server 30. Whenever the real time prices for a particular instrument specified in spreadsheet 10 changes, the price contained in (displayed by) the spreadsheet 10 changes accordingly. As an alternative to the DDE mechanism, Object Linking and Embedding (OLE) tools can be used. OLE enables one to create objects with one application and then link or embed them in a second application. Embedded objects retain their original format and links to the application that created them.

The DDE 15 is coupled to the workstation's Internet web browser 20. In the preferred embodiment, the web browser is INTERNET EXPLORER™ from MICROSOFT™. Similar to the add-in for the spreadsheet 10, the system of the present invention further has a signed Java applet which operates in conjunction with the web browser 20 to provide the functionality described herein. The web browser 20 provides connectivity, though the communication network 25 to server 30. In the preferred embodiment, the communication network 25 is the Internet, but a private network or a dial up connection could be used. Such alternatives are not preferable to the Internet, though, given the ubiquity of the Internet. Web browser 20 communicates with the server 30 using a combination of streaming HTTPS data (for price and order updates) and synchronous HTTPS requests (for subscriptions and order submission).

Server 30 is the element of the present invention that maintains all of the real time financial instrument data and provides the interface for the execution of order submission. In the embodiment of the present invention involving non-exchange traded financial instruments (such as bonds or OTC equity warrants), the data maintained in server 30 is gathered from non-publicly available sources. Specifically, since the financial instruments are not exchange traded, the pricing of the instrument is made via quotes. In the preferred embodiment, this data is supplied from automated price generation systems controlled by traders for the OTC instruments. For ET instruments, the prices for the instruments are obtained from exchange feeds or market data vendor feeds (e.g. Bloomberg). Server 30 is coupled to various trading engines 35 which serve to actually execute the orders received from the customers through the spreadsheet 10 and the server 30. The trading engines operate in the various markets in which the financial instruments are traded. In the preferred embodiment, OTC orders are executed automatically by execution engines 35 based on trader-supplied parameters, as known by those skilled in the art. ET orders are preferably routed to the trading desks of the operators of the system of the present invention or to external exchanges for execution. Based on the architecture shown, orders would be routed through server 30 and routed to the external exchanges. Alternately, the data feed can be routed directly from the user to the external vendor. The manner in which the data feed is routed is dependent upon the system architecture and the way the exchange licenses market data distribution.

Figure 2:
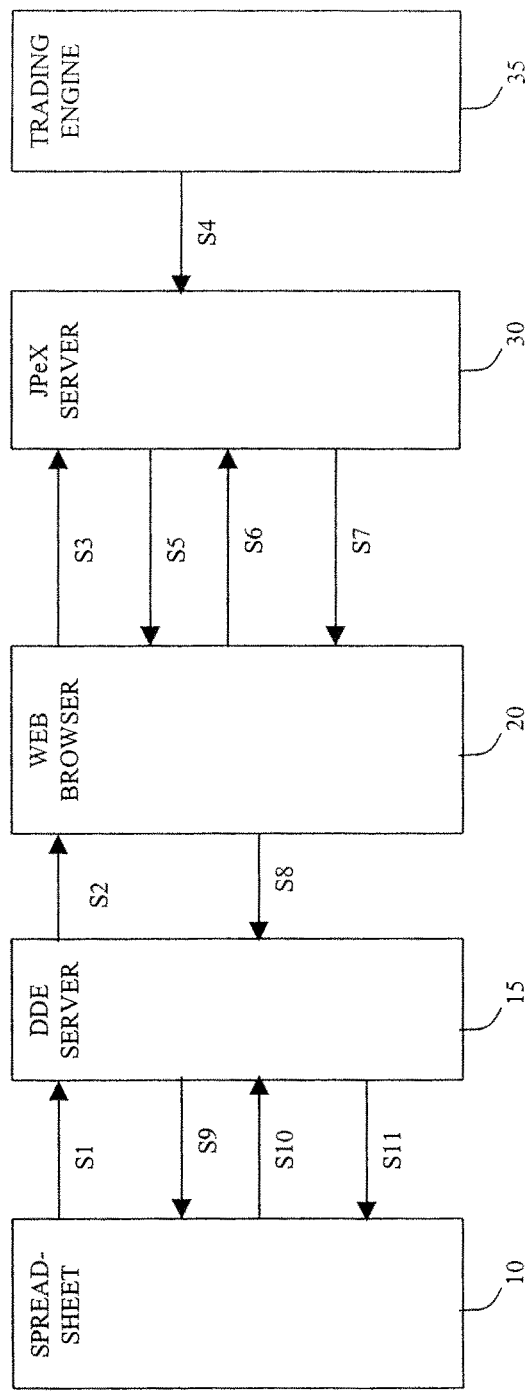
FIG. 2 illustrates the steps for obtaining real time price quotes.

FIG. 2 illustrates the interaction of the various components and the steps for obtaining real time price quotes. As previously described, the system of the present invention allows the user to use it familiar spreadsheet application 10 to define cell formulas that reference various attributes of a financial instrument. For example, the instrument can be described in a sheet of the spreadsheet application 10 in terms of its bid and ask prices and sizes, its trading status, and other real-time information, as well as reference data such as maturity date. As those skilled in the art are familiar with the types and formats of programming available in electronic spreadsheet applications 10, no further discussion is necessary with respect to the routine establishment of a sheet in such a spreadsheet application 10. In the preferred embodiment, the user of the system programs one or more sheets in the spreadsheet application 10 to reflect his/her trading strategy.

As described in FIG. 2, the spreadsheet 10 will be automatically, continuously, and instantaneously updated to reflect any changes in the data related to any instrument defined in the spreadsheet 10. This automatic and continuous updating is accomplished through the DDE server 15. Values for specific attributes related to an instrument can be used in the present invention as any traditional spreadsheet value could be used. Such values can be entered into formulas, formatted using standard spreadsheet formatting rules (including dates and times), etc. The system of the present invention automatically loads and subscribes to the quotes (the data related to the financial instrument) when the spreadsheet 10 sheet is first loaded, assuming that you are set up to see the corresponding instrument.

Prices and statuses from server 30 can also be used to update conditional formats in spreadsheet 10. This feature of the present invention allows the user to highlight changes that the user desires to be tracked closely. For example, a cell could cause to change color when a bid or ask price approaches or passes a target, assisting the user in monitoring and executing the user's predefined trading strategies with less effort.

Prior to the acquisition of real time data, the user loads his/her trading strategy sheet into spreadsheet 10. This sheet identifies the financial instruments in which the user is interested. The instruments are identified by their industry standard codes such as ISIN (for International Securities Identification Number) or CUSIP (for Committee on Uniform Securities Identification Procedures), using a symbol such as ISIN_xxxxxxxxxxxx, where xxxxxxxxxxxx is the 12 character ISIN code for the instrument In step S1, the spreadsheet 10 contacts the DDE server 15 and subscribes to a DDE topic and several DDE items in order to obtain the data related to the instrument(s) contained in the user's sheet in the spreadsheet 10. As known to those skilled in the art, a topic is the first part (usually a broader category) and item is a narrower piece of information. DDE 15 is relatively flexible about how one uses the constructs of topics and items. In a preferred embodiment of the present invention, topics are used to identify instruments and orders, and items are used to identify fields within these. As appreciated, different market data vendors and system designers can construct their data structures differently. Using Excel, the full DDE syntax in Excel is "=Service|Topic!Item." In the preferred embodiment this will result in a syntax of "=Service|InstrumentID!FieldName". By subscribing, the spreadsheet 10 is requesting that the DDE 15 set up links with server 30 to retrieve all of the relevant data for the instruments specified in the subscription. In step S2, the DDE 15 passes the subscription onto the Java applet in the web browser 20. An example of a protocol for the transmission of the subscription from the DDE 15 to the Java applet 20 for a single instrument with an ISIN code of ISIN_DE0001135135 is as follows:
SUBSCRIBE|ACTIVATE|ISIN_DE0001135135|*

In step S3, the Java applet in the web browser 20 transmits a query to the server 30 with respect to the instrument(s) specified in the subscription from the DDE 15. Note that the communication network 25 (FIG. 1) has been omitted in the present Figure, merely for reasons of simplicity. Again, in the preferred embodiment, the communication network 25 is the Internet. In response to the query form the web browser 20, in step S5, server 30 returns reference data related to the specified instrument(s) to the Java applet in the web browser 20. The reference data is obtained by the server 30 from the real time markets through trading engines 35 (only one shown). The reference data is obtained in order to determine a correlation between the descriptions of instruments as used by spreadsheet 10 and by the real time markets. For example, the symbol used by an Excel spreadsheet 10 is not the same as that used by the real-time market data infrastructure. One advantage of providing this abstraction of the real time market symbols this is that the server 30 can obtain prices for the same instrument from different sources in response to a single query by a user using a single common description of the instrument.

Once the correlation for the symbols for the instrument is established, the trading engines 35 continuously updates the instrument data to the server 30 (step S4). In the ET embodiment, the real time data representing the financial instruments can be received from an external vendor for this data. In a preferred embodiment, the data from trading engines or the external ET vendor is cached by server 30 (or by a separate caching system coupled to server 30.

In step S6, the Java applet in the web browser 20 transmits a subscription to server 30 with respect to the real-time data related to the specified instrument(s). In response to this subscription, the server 30 returns real time updates for the instrument(s) to the web browser 20 (step S7). Most importantly, the real time update data for the instrument includes real time updates with respect to the price of the instrument(s). If the instrument is a stock, though, important update data could include the quantity of the stock traded for the day. Trade volume is data related the stock that changes constantly and must be updated and monitored in real time in certain trading strategies.

In step S8 web browser 20 passes the updated instrument data onto DDE server 20. Below is an example of the format of such an update.

M|u|ISIN_DE0001135135|DESCRIPTION=BUND 5.375 Jan10|MARKET_PHASE=System Unavailable|CCY=EUR|BID_QTY=10,000,000|BID=103.41| ASK=103.51|ASK_QTY=10,000,000|BID_YLD=4.817| ASK_YLD=4.802|YLD_CHG_DAY=-5.933|ASSET_SWP=- 15|ASSET_SWP_CHG=1|TIME=12:08:32|CODE=ISIN DE0001135135|MATURITY_DT=2010/01/04|SETTLE_DT= 2002/07/05|COUNTRY=DE|ISSUE_DT=1999/10/12| INSTR_GROUP=EGB German|COUPON=5.375|PRICE_CHG_DAY=0.373|PVBP= 6.316|SUPPORT_CODE=|BID_PRICE_FLAG=Firm|

-continued

ASK_PRICE_FLAG=Firm|BID_STATUS=Active|ASK_ STATUS=Active| BID_TICK=0|ASK_TICK=0|SYS_SOURCE_LOC=LON Steps S4, S7 and S8 continuously feed new pricing data for the instruments in the subscription from the trading engines 35 to the server 35 to the web browser 20 to the DDE server 15. This automatic feed continues until the subscription is cancelled. No further requests from the DDE 15 or web browser 20 are required. In step S9, the price update is passed onto the spreadsheet application 10 from the DDE 15. The spreadsheet 10 uses this data to update the sheet that initiated the entire process. Steps S10 and S11 illustrate the continuous process by which the spreadsheet 10 is updated with new real time pricing data from the DDE server 15. DDE 15 notifies spreadsheet 10 when update data is available. Spreadsheet 10 pulls the update data from DDE 15 when it is ready to process the update data. Spreadsheet 10 then waits for another notification from DDE 15 that updated data is available. Once it has established a subscription with respect to one or more instruments, it is not necessary for spreadsheet 10 to actively poll DDE 15 for data updates.

FIG. 3 illustrates a sample sheet 150 in spreadsheet application 10 that has been populated by the system of by the present invention in accordance with the process described in connection with FIG. 2. Although the screen illustrated in FIG. 3 depicts eight different columns, as appreciated by those skilled in the art, the user can choose to include any combination of the fields that constitute the reference data that defines the instruments. Typically, there are 50-150 fields that describe any particular financial instrument. Column 155 contains the industry standard codes for the financial instruments that the user has included as part of sheet 150. Again, these financial instruments are instruments that the user has chosen to keep track of, and include as part of the user's trading strategy. Column 160 contains the description of the instruments of column 155. Columns 165, 170, 175 and 180 respectively contain the Bid and Ask quantities as well as the Bid and Ask prices. Column 185 indicates whether or not the market for the particular instrument is presently open. Finally, column 190 contains a proposed settlement date for a trade involving any particular financial instrument.

As appreciated by those skilled in the art, sheet 150 can contain formulas and other programming that analyzes the data for the financial instruments. In a simple example, the Bid 165 and Ask 170 columns can be conditionally formatted to indicate tic up/down in these prices by shading the changing values in different colors (e.g., red and green). As further described below, other extensive programming can be applied to the cells of the sheet 150 to implement the user's trading strategy. For example, in a simple trading strategy, the user can program spreadsheet 10 to implement a trading strategy that recognizes when the price of an instrument reaches a predetermined threshold, that the instrument should be sold. As appreciated by those skilled in the art, this is the simplest of trading strategies. Modern electronic spreadsheets 10 are capable of implementing incredibly complex trading strategies analyzing the data for hundreds or even thousands of financial instruments in real time. Tabs 195 and 200 indicate other sheets for implementing the user's other trading strategies.

Figure 4:
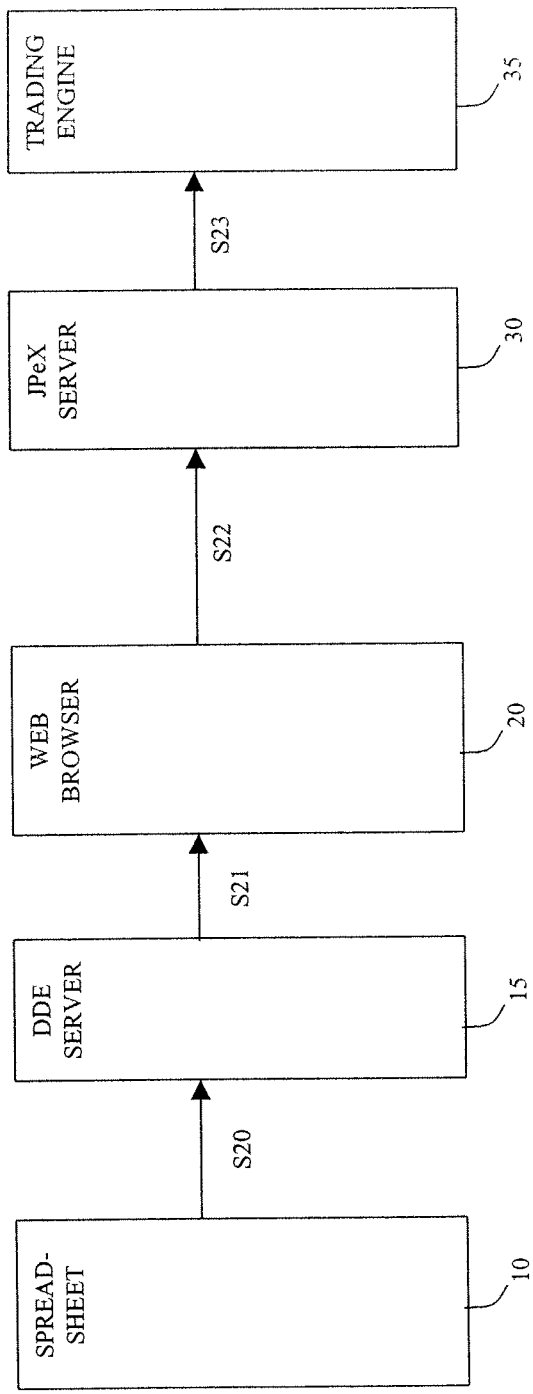
FIG. 4 depicts the steps for submitting an order.

FIG. 4 illustrated the submission flow for orders in accordance with the present invention. Orders are the instructions from the user to either buy or sell one or more financial instruments. There are several methods according to the present invention by which orders can be prepared in spreadsheet 10 prior to their transmission and execution. The method of the present invention allows the user to automate routine order entry tasks, such as those involved with re-balancing a portfolio or hedging a book.

There are two basic ways in which the system of the present invention generates orders, one manual and one automatic. In each of the methods, the order would contain the basic information required to execute the order such as a description of the financial instrument (e.g., the ISIN number), the quantity, the price, the settlement date, etc. IN the manual mode, the user has an active page on spreadsheet 10 that contains all of the potential orders. One of the columns associated with each order is an "Enabled" column that indicates whether the user wants a particular order executed or not. The spreadsheet has a button 200 (See FIG. 3) that the user activates to submit the orders. Only the orders with a positive indication in the "Enabled" column will processed for submission to the trading engines 35 (see FIG. 1). In the preferred embodiment, the system requires active confirmation for all orders that are submitted manually.

In the automatic mode, spreadsheet 10 is programmed to automatically generate and submit orders if certain conditions occur. In a very simple example, the user can specify that an order be executed if the price of a particular financial instrument attains a certain value. As appreciated by those skilled in the art, spreadsheet 10 can be programmed to evaluate hundreds of variables in executing complex trading strategies in order to determine if an order should be automatically submitted. As with the manual mode, the automatically submitted orders contains all of the information required to execute the order (e.g., price, quantity . . . )

In a preferred embodiment, the spreadsheet generates an order ID when the order is submitted. This order ID can be written into a cell of the spreadsheet. The order ID is used to obtain order status updates for specific orders. The order ID allows precise automated monitoring of order status, which in turn allows trading strategies to be developed that depend upon the execution status of a previous order. For example, a limit order can be submitted to an exchange, which is not executed immediately. When the limit order is executed, another order can be automatically submitted, possibly on another market, e.g., an OTC bond order. The order ID allows individual orders to be tracked and allowing various trading strategies to be implemented including automated trading.

In step S20, spreadsheet 10 has generated an order that contains instructions with respect to one or more financial instruments. As part of the actual order, spreadsheet 10 includes a unique order identifier (e.g., BRIANLYNNTRADER2002070212190000). This unique order identifier is assigned by the spreadsheet 10 add-in, which updates the sheet from which the order originated to create a subscription to keep track of the status of the execution of the order (see below).

DDE server 15 receives the order from spreadsheet 10 and transmits the order to the web browser in step S21. The order submitted by DDE 15 retains the unique order identifier assigned by spreadsheet 10. The following is an example of the protocol of the order transmitted by DDE 15:

```
JPEX_ORDER|BRIANLYNNTRADER2002070212190000|
ISIN_DE0001141281|ORDER_QTY=10000|
BUY_SELL=FALSE|ORDER_TYPE=IMMEDIATE|
PRICE_CHECK_TYPE=At Market|
BATCH=BRIANLYNNTRADER2002070212183600RANGE
```

In step S22, web browser 20 transmits the order (still including the unique order identifier) to the server 30. One again, the communication network 25 (FIG. 1) has been omitted from the present Figure merely for purposes of clarity. Upon receipt of the order from web browser 20, server 30 saves original order that contains the unique order identifier. As explained below, this is a significant feature of the present invention that allows tracking of the status of the order by one or more parties. In processing the original order, server 30 takes the information contained in the order and generates executable orders in the format required by trading engines 35. This is the reason that server 30 must save the original order containing the unique order identifier. Otherwise, the original order identifier generated by spreadsheet 10 would be lost to server 30 and thus unusable for updating the order status in linked spreadsheets 10.

In step S23, sever 30 sends the formatted order (or multiple orders if several financial instruments are involved) to trading engines 35. The orders sent to trading engines 35 by server 30 contain new unique server order identifier that is generated by server 30 and inserted into the order(s). Server 30 maintains a database in which it correlates the unique order identifier generated by spreadsheet 10 with the unique server order identifier that it has generated. This correlation is used by server 30 to enable tracking by the system of the status of the orders submitted by the spreadsheet 10 as illustrated in FIG. 5.

Figure 5:
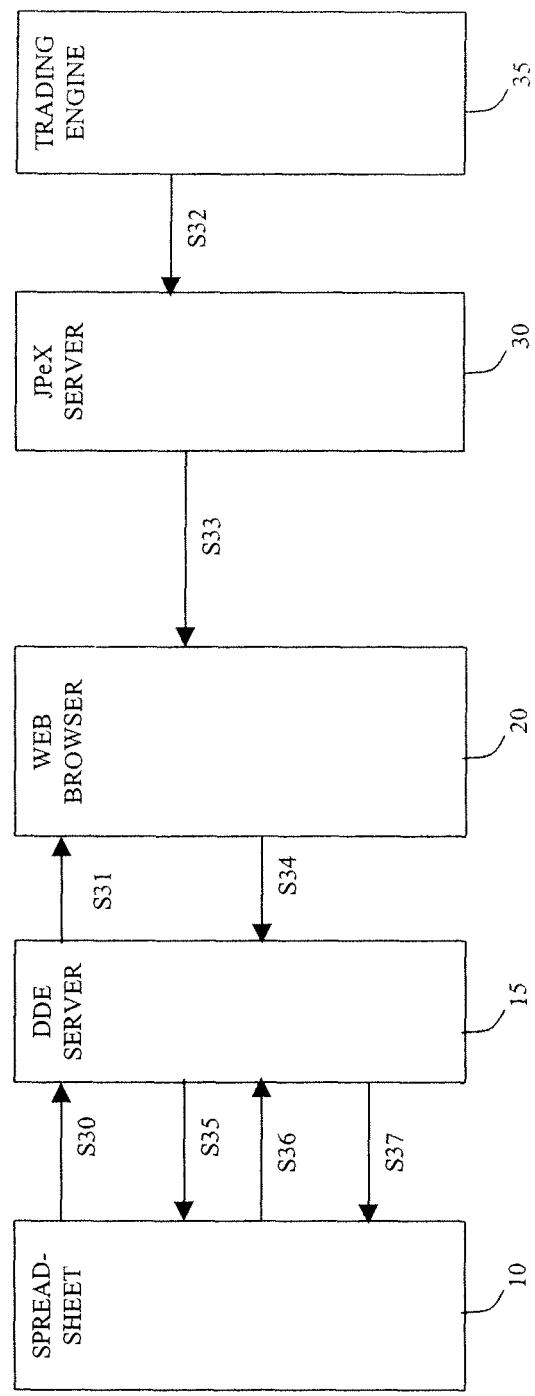
FIG. 5 illustrates the steps for obtaining the status of an order.

FIG. 5 illustrates the method of the present invention for tracking the status of an order. The present invention provides the capability to monitor the status of orders in real time. The DDE references to various order fields, including order ID, status, executed quantity and price, update time, etc can be entered on a sheet in spreadsheet 10 to view the real time status of the orders. These values are also provided in standard spreadsheet 10 data types, and can be used to drive formulas. For example, a status sheet could use the executed quantity in a formula to drive a position-keeping sheet. In a preferred embodiment of the present invention, when an order is submitted, an entry is automatically created for the submitted order on a status sheet known as a blotter. Once the order is submitted, the system creates the status entry on the blotter sheet and the user is able to switch over to that blotter to view the status of all of its orders.

In step S30 of FIG. 5, spreadsheet 10 submits a subscription 10 DDE 15 with respect to the order for which status is desired. In the subscription, the topic is set equal to the unique spreadsheet identifier as previously described with respect to FIG. 4. An example of the format for such a subscription is: BRIANLYNNTRADER2002070212. DDE 15 takes this subscription from spreadsheet 10 and in step S31 transmits the subscription to the add-in in the web browser. The subscription from DDE 15 to web browser 20 includes the unique spreadsheet identifier associated with the order. A sample protocol for the subscription is:
SUBSCRIBE|ACTIVATE|JPEX_ORDER.DDE.BRIANLYNNTRADER2002070212190000|*

In the preferred embodiment, server 30 is programmed to automatically provide status updates for all active orders after the order has been submitted to server 30. Accordingly, there is no need for web browser 15 to send any further messages to server 30 to set up the subscription for the status of active orders. In step S32, the trading engines 35, pursuant to the automatic updating of the preferred embodiment, provides server 30 with an update of all of the fields associated with the order. The order status from the trading engines only includes the server 30 assigned identifier, as the trading engines 35 are unaware of the spreadsheet identifier. Upon receipt of the update from the trading engines 35, the server 30 consults its database and retrieves the spreadsheet unique order identifier and appends that identifier to the order status.

In step S33, server 30 transmits the order status to web browser 20 (in a preferred embodiment through the Internet, not shown). The order status from server 30 preferably contains both the server identifier for the order as well as the spreadsheet identifier. One reason for the inclusion of the server identifier is that in one embodiment of the present invention it is possible for spreadsheet 10 to keep track of orders by the server identifier in addition to the internally assigned spreadsheet identifier. This allows the spreadsheet to track orders not originally submitted from a spreadsheet, e.g. orders submitted directly into web browser 20. Due to the automatic updating of order status in the preferred embodiment, steps S32 and S33 continually feed the web browser 10 with the updates of the statuses of the active orders.

In step S34, the add-in to the web browser 20 transmits the received order status to DDE server 15. The order status preferably contains the unique spreadsheet identifier and optionally contains the server identifier or other identifier that allows the spreadsheet to uniquely identify the order. A sample protocol for the order status is as follows:

```
M|u|JPEX_ORDER.DDE.TRADER12002072417301701|ORDER_
ID=10,997|Trade ID=7,409|RFQ_ID=|ORDER_STATUS=Executed|
INSTR_NAME=OBL 128 3.75
Aug03|BUY_SELL=Sell|CCY=EUR|EXEC_QTY=10,000|MARKUP=
---|Exec Spd=---|SETTLE_AMT=0|SETTLE_DT=2002/07/29|EXCH_
CODE=|REJECTION_MSG=|ORDER_QTY=10,000|PRICE_
CHECK_TYPE=At Market|VALIDITY=Immediate|PRICE=100.306|
Order Spd=---|QUOTED_PRICE=---|Quoted Spd=---|LOCAL_CODE=
|CREATION_DT=2002/07/24|CREATION_TIME=17:30:17|UPDATE_
DT=2002/07/24|UPDATE_TIME=17:30:20|INSTR_ALT_ID=
DE0001141281|USER_ID=trader1|NOTES=|REM_QTY=0|FILLS=
1|COUNTRY=DE|CLIENT_FIRM=BL Company|EE_ORDER_ID=
133773|EE Trade ID=118518|EE_QUOTE_ID=|DESCRIPTION=
OBL 128 3.75 Aug03|CODE=DE0001141281|INSTR_GROUP=EGB
German|LIMIT_POS=|EXEC_PRICE=100.306|STOP_PRICE=---
|BE_CREATION_DT=2002/07/24|BE_CREATION_TIME=17:30:17|
BE_UPDATE_TIME=17:30:20|BE_ACCOUNT=GSAMXLON|
ACCOUNT_NAME=account 1|CTI=|ORIGIN= |FEE= |ALLOC_
PCT=|ACCOUNT_TYPE=|EXCH_ORDER_ID=133773|CREATOR_
ID=trader1|LAST_MOD_ID=trader1|ORIG_OWNER_ID=trader1|
BE_USER_ID=|AltOrderID=TRADER12002072417301701|
AltBatchID=TRADER12002072417301700RANGE|
AltOrderSource=Excel Manual|INSTR_ID=ISIN_DE0001141281|
DDE_ORDER_ID=TRADER12002072417301701
```

In step S35, DDE server 15 notifies spreadsheet 10 that an update to the status of the order is available. In step S36, spreadsheet 10 requests the update. And in step S37, DDE server 15 provides the update to spreadsheet 10. Spreadsheet 10 then uses the updated data to refresh the data corresponding to the order contained on one or more sheet within spreadsheet 10.

Figure 6:
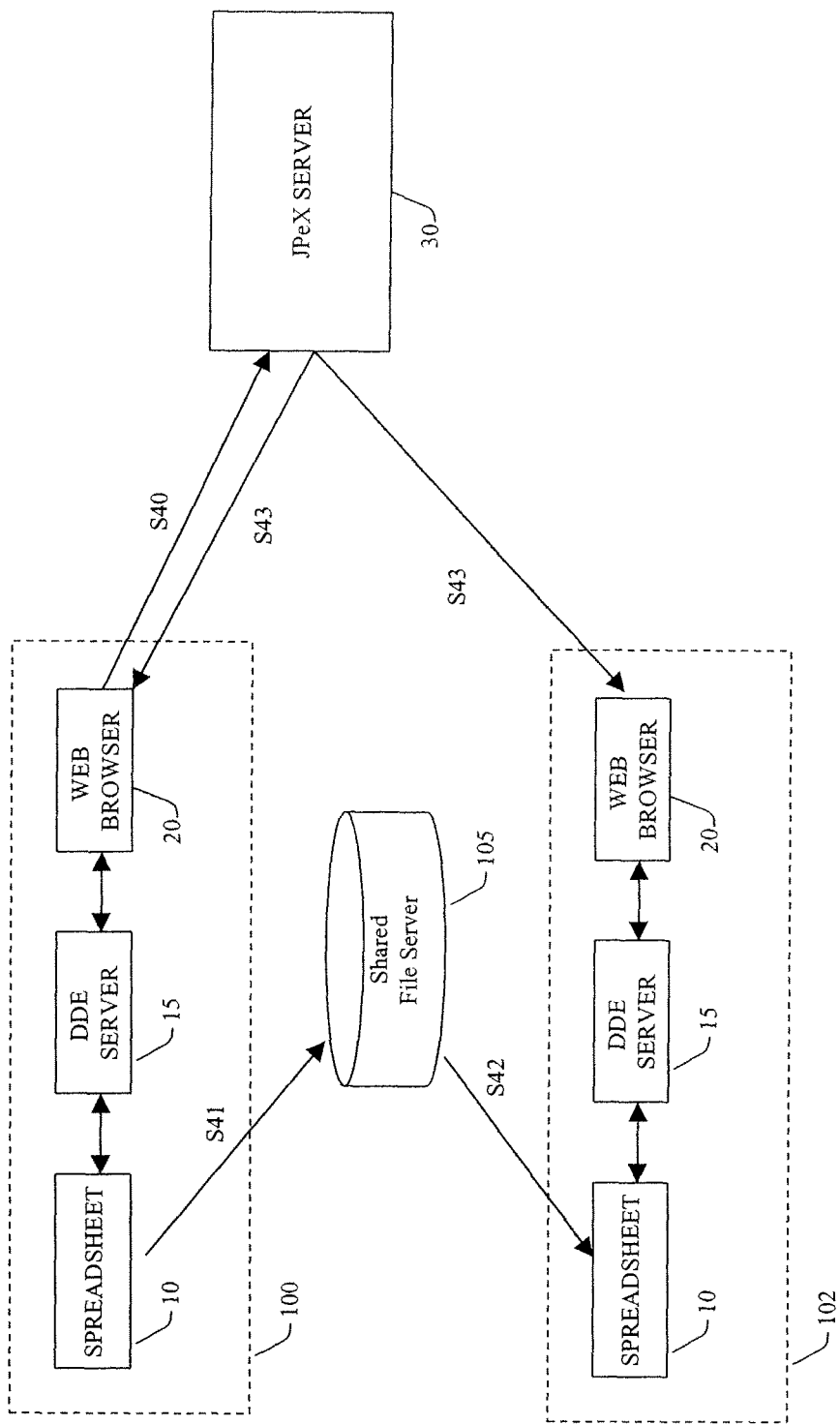
FIG. 6 illustrates the system for two traders to obtain order status.

FIG. 6 illustrates the system for two traders to obtain order status. In particular, this embodiment is useful for executing a hedging strategy. FIG. 6 illustrates the process by which trader 102 can monitor trader 101's complex trading strategies using spread sheet 10. In this embodiment, each trader 100 and 102 has identical systems, namely a spreadsheet application 10 with an appropriate add-in as described above, a DDE server 15 and a web browser 10 (with appropriate applet). In a hedging scenario, trader 100 is performing trades against which trader 102 is hedging.

In this scenario, trader 100 creates a series of automatically maintained limit orders in it spreadsheet 10 and saves a copy of his spreadsheet-based orders. Trader 102 then loads a view of these orders and automatically sets up hedging orders in a second session in his spreadsheet application 10. The hedging orders of trader 102 are based on real-time price and order status feeds relative to trader 100's orders. As previously described, all trading strategies according to the present invention are entirely user-definable using the rules of the spreadsheet application 10.

In step S40, trader 100 submits his orders to server 30 as previously described with respect to FIG. 4. In step S41 trader 100 saves his spreadsheet that contains the unique spreadsheet order identifiers to a shared file server 105. In step S42, trader 102 retrieves the saved spreadsheet that contains trader 100's live orders. In step S43, each of traders 100 and 102 begins receiving the order status updates for the live orders as previously described with respect to FIG. 5. Again, trader 102 is able to retrieve the status of the order of trader 100 because trader 2 is using the unique spreadsheet order identifier assigned to trader 100's orders. Server 30 is able to provide trader 102 with the status of trader 100's orders as trader 102 is using the unique order identifiers assigned to trader 100's orders. In executing a hedging strategy, the spreadsheet 10 of trader 102 will monitor the status of the orders of trader 100, and when specific conditions occur (e.g., trader 100's orders are executed), trader 102's spreadsheet 10 will automatically generate its own hedging orders.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A computer-implemented system for generating hedging orders for financial instruments, the system comprising:
 a shared file server for receiving spreadsheets from at least two trader systems including a first spreadsheet having a first unique order identifier from a first trader system, and a second spreadsheet having a second unique order identifier from a second trader system, each trader system including;
 an electronic spreadsheet application executed by a processor,
 a Dynamic Data Exchange (DDE) interface coupled to the electronic spreadsheet application, the electronic spreadsheet application configured to create and transmit orders to the DDE interface with respect to the financial instruments, each order containing the respective unique order identifier; and
 a financial instrument server coupled to the DDE interface of each trader system, the financial instrument server storing the unique order identifier and generating an executable order for forwarding to a trading engine, the financial instrument server automatically receiving real time update data from the trading engine and transmitting the real time update data to the electronic spreadsheet application through the DDE interface,
 wherein the second trader system submits a status request using the first unique identifier in order to monitor orders of the first trader and upon receiving a predetermined real time update related to the first order, generates the second order having the second unique order identifier using the spreadsheet of the second trader system in order to hedge against the first order.

2. The system of claim 1, wherein each executable order contains a unique server order identifier, the financial instrument server maintaining a database correlating each unique order identifier with the corresponding unique server order identifier, thus correlating the order generated by each electronic spreadsheet application with the executable order, wherein the corresponding unique order identifier differs from the unique server order identifier.

3. The system of claim 2, wherein, based on a subscription request, the trading engine automatically provides real time update data related to the financial instrument, including the unique server order identifier, to the financial instrument server, the financial instrument server correlating the unique server order identifier with the corresponding unique order identifier and transmitting the real time update data including the corresponding unique order identifier to the electronic spreadsheet application through the DDE interface.

4. The system according to claim 3, further comprising a web browser coupled between the DDE interface and the financial instrument server, wherein the web browser receives the subscription from the DDE interface, receives the real time data from the financial instrument server, and publishes the real-time data to DDE.

5. The system according to claim 4, further comprising a communication network coupled between the web browser and the financial instrument server.

6. The system according to claim 5, wherein the communication network is the Internet.

7. The system of claim 1, wherein the financial instruments are exchange traded instruments and prices for the financial instruments are obtained from exchange feeds and market data vendor feeds.

8. The system of claim 1, wherein the financial instruments are non-exchange traded instruments and prices for the financial instruments are obtained from automatic price generation systems.

9. The system of claim 1, wherein the spreadsheet of each trader system is automatically and continuously updated to reflect any changes in data related to financial instruments referenced in the spreadsheet.

10. The system of claim 1, wherein each spreadsheet is programmed to automatically generate and submit orders if certain conditions occur.

* * * * *